(12) United States Patent
Wheeler

(10) Patent No.: US 12,613,862 B2
(45) Date of Patent: Apr. 28, 2026

(54) COMMUNICATIONS NETWORK TOPOLOGY FOR MINIMIZING LATENCY IN A MANY-TO-ONE ENVIRONMENT

(71) Applicant: WHISPER CAPITAL, LLC, Chicago, IL (US)

(72) Inventor: Glen Wheeler, Tampa, FL (US)

(73) Assignee: Whisper Capital LLC, Chicago, IL (US)

( * ) Notice: Subject to any disclaimer, the term of this patent is extended or adjusted under 35 U.S.C. 154(b) by 94 days.

(21) Appl. No.: 18/270,686

(22) PCT Filed: Dec. 30, 2021

(86) PCT No.: PCT/US2021/065644
§ 371 (c)(1),
(2) Date: Jun. 30, 2023

(87) PCT Pub. No.: WO2022/147220
PCT Pub. Date: Jul. 7, 2022

(65) Prior Publication Data
US 2024/0297913 A1 Sep. 5, 2024

Related U.S. Application Data

(63) Continuation-in-part of application No. 17/316,603, filed on May 10, 2021, now abandoned.
(Continued)

(51) Int. Cl.
*G06F 16/23* (2019.01)
*G06F 16/2455* (2019.01)
(Continued)

(52) U.S. Cl.
CPC .... *G06F 16/2379* (2019.01); *G06F 16/24556* (2019.01); *G06F 16/2457* (2019.01);
(Continued)

(58) Field of Classification Search
CPC ........... G06F 16/2379; G06F 16/24556; G06F 16/2457; G06F 16/27; G06F 16/282; G06F 16/256; H04L 47/829; H04L 67/10015
See application file for complete search history.

(56) References Cited

U.S. PATENT DOCUMENTS 6,961,363 B1 * 11/2005 Anvekar ................ H04B 1/715
375/132
8,433,771 B1 * 4/2013 Ellsworth ............... G06F 16/13
709/216
(Continued)

FOREIGN PATENT DOCUMENTS

WO 2015177802 A1 11/2015

OTHER PUBLICATIONS

International Search Report issued in Application No. PCT/US2021/065644, dated Mar. 25, 2022.

*Primary Examiner* — Robert W Beausoliel, Jr.
*Assistant Examiner* — Mohammad S Bhuyan
(74) *Attorney, Agent, or Firm* — Much Shelist P.C.

(57) ABSTRACT

The disclosure herein provides a pyramid topology for a communications network in which an authoritative server sits at the top of the pyramid. This is the "principal" server. The principal server connects to a sub-layer of "subordinate" servers (i.e., slave servers). The principal server gathers data from the subordinate servers at a predetermined interval based on the maximum number of connections that can be serviced within the desired timeframe. An additional layer of lower-level subordinate servers can be added under each of the higher-level subordinate servers to increase the network capacity. Additional levels of subordinate servers can be added to further increase the network capacity such that a single network may include a principal server and many (Continued)

cascading levels of subordinate servers to form the pyramid structure.

20 Claims, 3 Drawing Sheets

Related U.S. Application Data

(60) Provisional application No. 63/132,987, filed on Dec. 31, 2020.

(51) Int. Cl.

| | |
|---|---|
| *G06F 16/2457* | (2019.01) |
| *G06F 16/25* | (2019.01) |
| *G06F 16/27* | (2019.01) |
| *G06F 16/28* | (2019.01) |
| *H04L 47/70* | (2022.01) |
| *H04L 67/1001* | (2022.01) |

(52) U.S. Cl.

CPC ............ *G06F 16/27* (2019.01); *G06F 16/282* (2019.01); *H04L 47/829* (2013.01); *H04L 67/10015* (2022.05)

(56) References Cited

U.S. PATENT DOCUMENTS

| | | | | |
|---|---|---|---|---|
| 2005/0283526 | A1* | 12/2005 | O'Neal | H04L 67/1048 709/217 |
| 2008/0183753 | A1* | 7/2008 | Maes | G06F 21/6218 |
| 2013/0085993 | A1* | 4/2013 | Li | G06F 16/27 707/E17.005 |
| 2018/0107794 | A1* | 4/2018 | Fierer | G06F 16/951 |
| 2018/0146262 | A1* | 5/2018 | Murugan | H04N 21/41415 |
| 2018/0300350 | A1* | 10/2018 | Mainali | G06F 16/9027 |
| 2020/0004757 | A1 | 1/2020 | Hirose et al. | |
| 2020/0372378 | A1 | 11/2020 | Isobe et al. | |

* cited by examiner

COMMUNICATIONS NETWORK TOPOLOGY FOR MINIMIZING LATENCY IN A MANY-TO-ONE ENVIRONMENT

CROSS-REFERENCE TO RELATED APPLICATIONS

This application is a national stage application under 35 USC 371 of international application PCT/US2021/065644 filed Dec. 30, 2021, which claims the benefit of priority to U.S. application Ser. No. 17/316,603 filed May 10, 2021, which claims the benefit of priority to U.S. Provisional No. 63/132,987 filed Dec. 31, 2020.

BACKGROUND OF THE INVENTION

The present subject matter relates generally to systems and methods for structuring a communications network topology in order to manage user updates to a database. More specifically, the present invention relates to a database network topology including the logical layout of a cascading series of servers in a communications network in which many user devices update individual data fields in a central server in a close to real-time environment.

The term "network topology" is used to describe the logical layout of a communication network. Within a topology, the term node describes an element in the system (a server, a user device, etc.) and the term "link" describes the communication path between the connected nodes, whether wired or wireless. There are various commonly known server topologies, such as, for example, point-to-point, daisy chain, bus, star, ring, mesh, tree, and hybrid (e.g., a combination of two or more of the known topologies). Each of these layouts provides its own strengths and weaknesses. For example, a bus topology may be easy to set up and maintain, but it becomes decreasingly efficient when the number of nodes increases and there can be security risks when each node in the network has access to the communications along the bus.

As the world becomes increasingly connected by networked communications, and as each user has essentially become a mobile node himself or herself (e.g., by accessing networks through their mobile devices), there is a need for server topologies that handle real-time communications amongst a massive number of nodes. For example, the network topology that supports social media platforms, such as Facebook, Twitter, Instagram, etc. must be capable of handling incoming communications from millions of users to update data fields in the system in a near real-time basis.

In many instances, these millions of social media users are not trying to update a single shared value in a central server. Instead, many users may be submitting unique content (e.g., a new post) and others may be submitting an update to a shared value (the number of likes on a given post). In rare instances in which millions of users may be updating a single shared value (e.g., the number of likes on a Facebook post of a famous account) the speed at which the aggregated data field is updated may not be critical.

By contrast, in a survey application, a question may be posed to a vast audience that may be answered by each audience member with a "yes" or a "no" response. In this case, the central server receives each user's response and updates the survey results in response to each user response. For example, the central server may receive 823,945 yes responses and 789,352 no responses and record the aggregated value for each in the central server. Solutions, such as a Redis Cluster, provide a mesh network of distributed servers in a cluster to service millions of users and replicate data between master and slave nodes. However, these solutions are designed to provide optimum failover and have the downside of introducing latency as additional servers are added into the network. There are instances in which the speed at which the users desire the values to be updated exceeds the capacity of these known topologies.

To make the point clear, when a given Tweet is posted to Twitter, the Tweet does not need to reach every other Twitter user within one second. Also, Twitter does not have one million users all updating a single Tweet at the same time. By contrast, a real-time survey application may want to be able to present survey results from millions of users to the millions of users in near real-time and, therefore, such systems require that millions of users are able to update a common shared value on the server in near real-time.

Accordingly, there is a need for a server topology that helps to minimize latency when receiving data inputs from a multitude of end user computing devices to update aggregated values in one or more data fields in a principal server, as described herein.

BRIEF SUMMARY OF THE INVENTION

To meet the needs described above and others, the present disclosure provides systems and methods for providing a database network or server topology that helps to minimize latency when receiving data inputs from a multitude of end user computing devices to update aggregated values in one or more data fields or databases in a principal or master server. The database network topology described herein allows a single shared value to be updated by a multitude of users simultaneously on multiple sub-level servers, which feed higher-level servers, which in turn aggregate the data from the sub-level servers and feed a master server, which aggregates all the data updates and feeds the aggregated data back to the users. The network topology is best represented as a pyramid.

The examples provided herein are made with reference to a mobile application referred to herein as the Sound Off! App. For purposes of this disclosure, the Sound Off! App is a mobile application in which sports fans are able to cheer for or jeer against participants in a live sporting event by communicating a "sentiment value." Using a live football game between the Tampa Bay Buccaneers and the Kansas City Chiefs as an example, in the Sound Off! App, each of the following sentiment values may be recorded: (1) the number of cheers for the Tampa Bay Buccaneers; (2) the number of jeers against the Tampa Bay Buccaneers; (3) the number of cheers for the Kansas City Chiefs; and (4) the number of jeers against the Kansas City Chiefs. These four values (i.e., sentiment values) can be visualized and presented in-stadium, as well as in-app, to the viewing and listening audience to demonstrate how engaged the fans of each team are at any given time. This dynamic interaction by fans, whether engaged in-person at the game or remotely, creates another mechanism for fans to be and feel engaged with the sporting event and connected to the other fans.

In the Sound Off! App, the speed at which the four tracked values (e.g., (1) the number of cheers for the Tampa Bay Buccaneers, (2) the number of jeers against the Tampa Bay Buccaneers, (3) the number of cheers for the Kansas City Chiefs, and (4) the number of jeers against the Kansas City Chiefs) is updated within the system is important. Reactions to events within a sporting event are feel more compelling the more instantaneous they are. The longer the delay between a play and a reaction, the less engaged and the less a part of the experience the user may feel.

As described above, known server topologies struggle to update shared values based on input from a multitude of users without introducing unwanted latency. To solve this problem, the present subject matter presents a unique server topology referred to herein as a pyramid topology. The pyramid topology is intended to enable the maximum number of nodes to interact with the exact same data point within the least amount of time.

In the pyramid topology presented herein, an authoritative server sits at the top of the pyramid. This is the "principal" or "master" server. The principal server connects to a sub-layer of "subordinate" or "slave" servers. The principal server gathers data from the subordinate servers at a predetermined interval based on the maximum number of connections that can be serviced within the desired timeframe. An additional layer of lower-level subordinate servers can be added under each of the higher-level subordinate servers to increase the network capacity. Additional levels of subordinate servers can be added to further increase the network capacity such that a single network may include a principal server and many cascading levels of subordinate servers to form the pyramid structure.

In the pyramid structure, each new layer of subordinate servers increases the latency of the system. For example, if the principal server can handle communications with 1,000 subordinate servers to update the four tracked values in one second, then each subordinate server can also handle communications with 1,000 subordinate servers to update the four tracked values in one second. Accordingly, by adding a second subordinate sub-layer of 1,000 servers to each of the first 1,000 subordinate servers, the network capacity increases from 1,000 users to 1,000,000 users and the time to update the four tracked values increases from one second to two seconds. Adding a third subordinate sub-layer of 1,000 servers to each server in the second subordinate layer of servers, the network capacity increases from 1,000,000 users to 1,000,000,000 users and the time to update the four tracked values increases from two seconds to three seconds.

Using the pyramid topology taught herein, following variables interact when solving for a system design. T is the maximum amount of time the system will take to update value X, N is the number of connections a single server can update in time t, and L is the number of levels of N nodes implemented. Accordingly, t times N equals T. The maximum number of connections that can update value X in T time is the number of nodes in the lowest level, which is equal to N to the power Y, where Y is equal to the number of levels of subordinate sub-layers.

An example of a method of minimizing latency in a communication network in which a plurality of user devices update a first data field may include the steps of: providing a principal server including a principal stored value of the first data field; providing a first sub-layer of subordinate servers in communication with the principal server, wherein each subordinate server in the first sub-layer includes a first sub-layer stored value of the first data field, wherein the first sub-layer of subordinate servers includes at least N-number of servers; providing an N-number of groups of second sub-layer of subordinate servers in communication with the first sub-layer of subordinate servers, wherein each subordinate server in the second sub-layer includes a second sub-layer stored value of the first data field, wherein each group of the second sub-layer of subordinate servers includes at least N-number of servers in communication with a respective one of the subordinate servers in the first sub-layer of subordinate servers; in each of the subordinate servers in the second sub-layer, receiving an end user input value of the first data field from one or more of the plurality of user devices; in each of the subordinate servers in the first sub-layer, receiving a second sub-layer input value of the first data field from each of the subordinate servers in the respective group of second sub-layer servers; in the principal server, receiving a first sub-layer input value of the first data field from each of the subordinate servers in the first sub-layer; and in the principal server, updating the principal stored value of the first data field to equal an aggregated value of the first sub-layer input value of the first data field from each of the subordinate servers in the first sub-layer, which is equal to an aggregated value of the end user input value of the first data field from each of the plurality of user devices.

An example of a communication network may include: a principal server including a principal stored value of a first data field; a first sub-layer of subordinate servers in communication with the principal server, wherein each subordinate server in the first sub-layer includes a first sub-layer stored value of the first data field, wherein the first sub-layer of subordinate servers includes at least N-number of servers; and an N-number of groups of second sub-layer of subordinate servers in communication with the first sub-layer of subordinate servers, wherein each subordinate server in the second sub-layer includes a second sub-layer stored value of the first data field, wherein each group of the second sub-layer of subordinate servers includes at least N-number of servers in communication with a respective one of the subordinate servers in the first sub-layer of subordinate servers; wherein each of the subordinate servers in the second sub-layer receives an end user input value of the first data field from one or more of a plurality of user devices; wherein each of the subordinate servers in the first sub-layer receives a second sub-layer input value of the first data field from each of the subordinate servers in the respective group of second sub-layer servers; wherein the principal server receives a first sub-layer input value of the first data field from each of the subordinate servers in the first sub-layer and updates the principal stored value of the first data field to equal an aggregated value of the first sub-layer input value of the first data field from each of the subordinate servers in the first sub-layer, which is equal to an aggregated value of the end user input value of the first data field from each of the plurality of user devices.

In each of the example system and method described above, the principal stored value of the first data field may be, for example, a sentiment value. The sentiment value may relate to a first participant in a live sporting event, whether an individual or a team/organization.

In some embodiments, the aggregated value of the end user input value of the first data field from each of the plurality of user devices triggers one of a visual effect or an audible effect at the live sporting event. For example, the visual effect may be a text, images, or video on one or more displays in the stadium hosting the live sporting event. For example, a Sound Off! Fan Meter may be displayed on a jumbotron in the stadium. The audible effect may be a noise amplified and projected at the stadium hosting the live sporting event. For example, the audible effect may be simulated cheering at the live sporting event. Similarly, the sounds could be a team fight song, a goal horn, a "sad trombone" sound when a team fails to achieve an objective, etc. The occurrence and strength of the sound may be related to the aggregated value of the end user input value. For example, some cheers could lead to an amplified cheering sound, while even more cheers could lead to the playing of the fight song. A smaller number of jeers may lead to an amplified booing sound, while a greater number of jeers may lead to a humorously mocking movie quote or similar.

In some examples, the principal server further includes a principal stored value of a second data field. The principal stored value of the second data field may be a sentiment value and the sentiment value may relate to a second participant in a live sporting event.

In another embodiment, a method of managing simultaneous user updates to a database to minimize latency includes providing at least one master server, the master server comprising at least one database with a single shared value; providing a plurality of slave servers, each slave server comprising the database with the single shared value; simultaneously updating, through a plurality of users, the single shared value on the user personal devices and transmitting the update to the slave servers, wherein the master server and the plurality of slave servers are capable of completing a maximum number of database updates within a timeframe; organizing the master server and the plurality of slave servers into a server topology comprising a top-tier, at least one mid-tier, and a bottom-tier, wherein the top-tier comprises the master server, the at least one mid-tier comprises slave servers which update the single shared value of the master server, and the bottom-tier comprises slave servers which update the single shared value of the at least one mid-tier; determining the number of the at least one mid-tier and bottom-tier slave servers in the server topology by comparing the maximum number of database updates within a timeframe the servers can achieve and a target timeframe for the master server to receive an update to the single shared value once the user has update the single shared value is received by the slave server, wherein a plurality of users will simultaneously transmit updates to the single shared value from their devices to the bottom-tier slave servers, which collect and aggregate the user updates into a single update value that is transmitted to the mid-tier servers; wherein the mid-tier servers receive a plurality of updates from mid-tier and bottom-tier slave servers, which collect and aggregate the user updates into a single update value that is transmitted to the either master server or other mid-tier servers, and wherein the master server receives a plurality of updates from mid-tier servers, which collects and aggregates the user updates into a single update value that is transmitted to user.

In other embodiments, the method further comprises erasing, by the slave servers, data from the single shared value when the server transmits an update to another server.

In still further embodiments, the method further comprises transmitting, by the master server, updates to the users back through the mid-tier and bottom-tier servers.

In still further embodiments, the method further comprises transmitting, by the master server, updates to the users back through a feedback server.

An object of the subject matter presented herein is to improve the fan experience for live sporting events by providing a "game within a game" by merging a live sporting event with a related live interactive game (typically provided on a mobile device such as a smartphone or tablet).

Another object of the invention is to provide a simple to use real-time interaction with a live sporting event that does not interfere with the viewer's focus on the live event and creates a sense of involvement in the live event by providing a meaningful mechanism for remote involvement.

Another object of the invention is to provide a new communication network topology that enables the recording of specific user input values in near real-time from a plethora of users.

Additional objects, advantages, and novel features of the solutions provided herein will be recognized by those skilled in the art based on the following detail description and claims, as well as the accompanying drawings, and/or may be learned by production or operation of the examples provided herein.

BRIEF DESCRIPTION OF THE DRAWINGS

The figures depict one or more embodiments of the subject matter described herein. They are provided as examples only. Within the figures, reference numbers are used to refer to elements described in the detailed description.

DETAILED DESCRIPTION OF THE INVENTION

Figure 1:
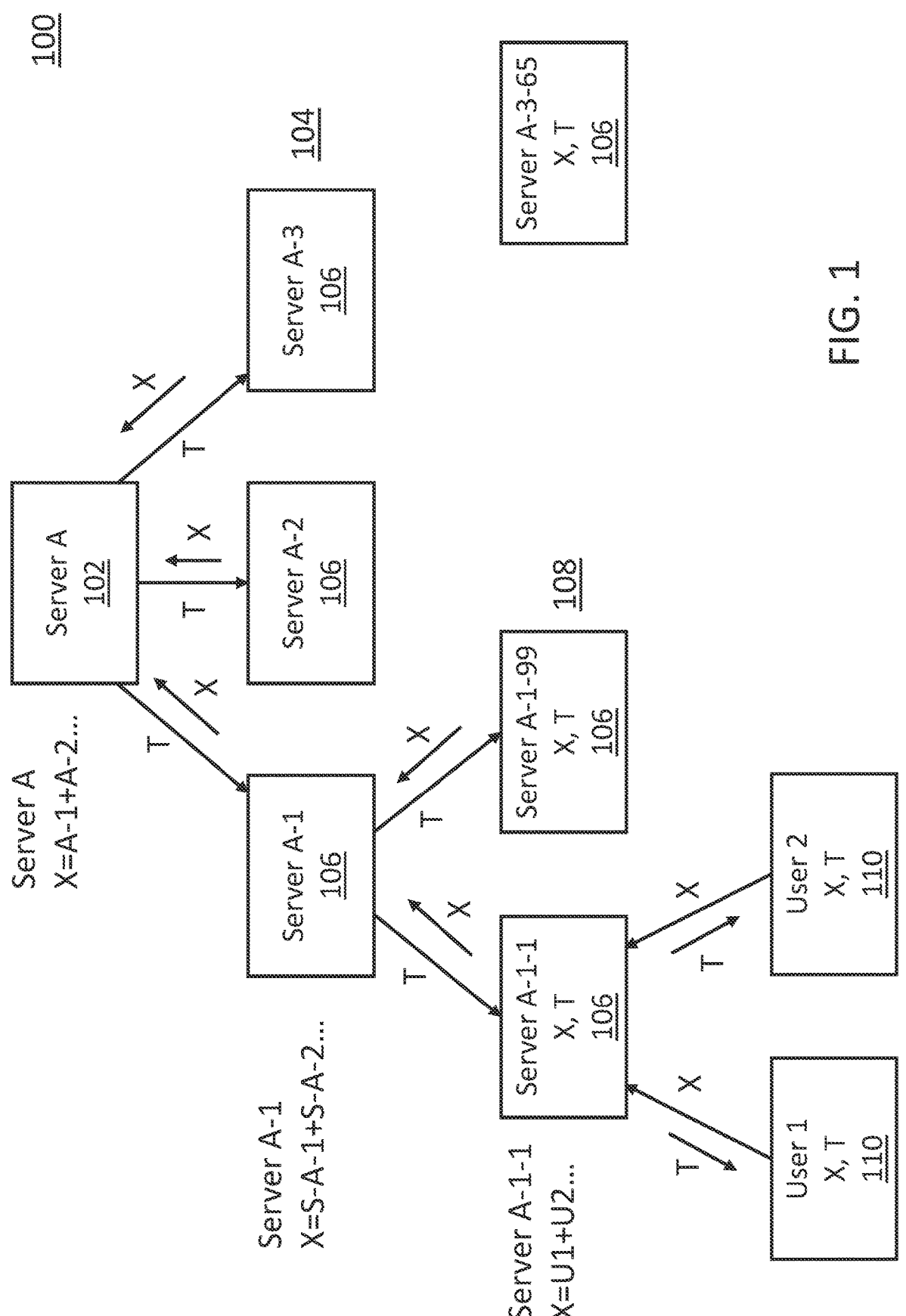
FIG. 1 is a schematic diagram illustrating an example of a pyramid server topology according to the teachings provided herein.
Figure 2:
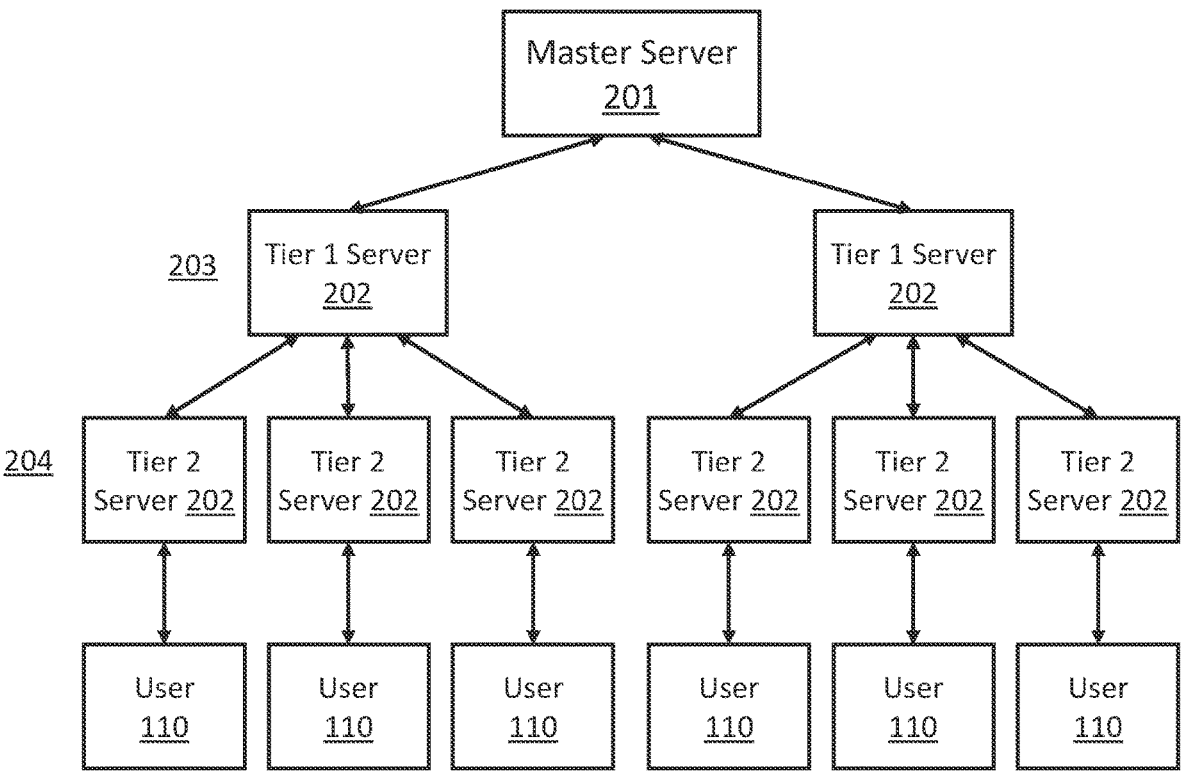
FIG. 2 is a schematic diagram illustrating a further example of a pyramid server topology according to the teachings provided herein.
Figure 3:
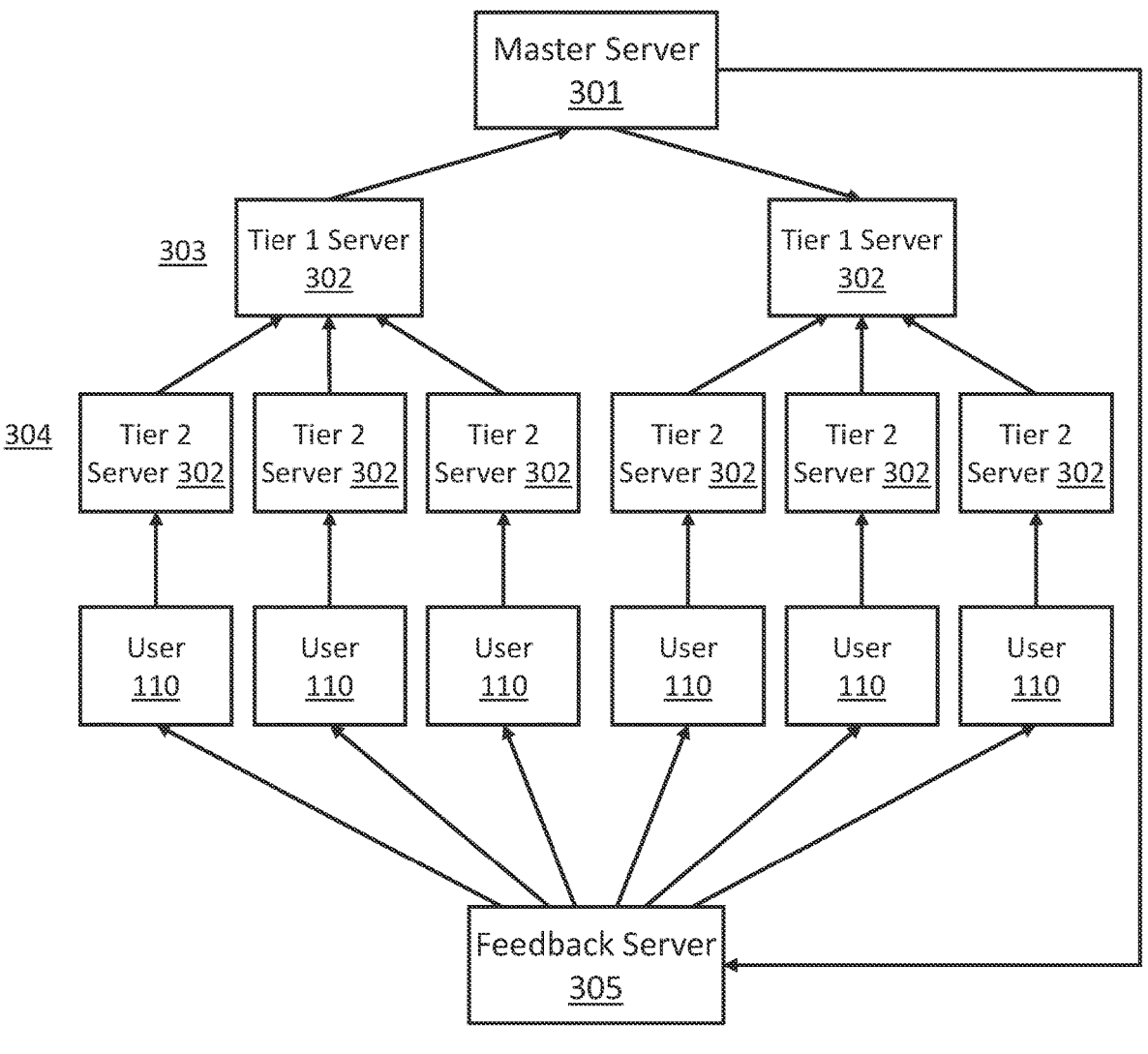
FIG. 3 is a schematic diagram illustrating a still further example of a pyramid server topology according to the teachings provided herein.

FIGS. 1-3 illustrate exemplary systems 100, 200, 300 for providing a server topology that helps to minimize latency when receiving data inputs from a multitude of end user computing devices to update aggregated values in one or more data fields in a principal server. The present invention was developed to allow millions of users to update an application database. In some embodiments, the application database contains a single shared value in a database which is updated by many users operating a variety of personal devices, such as cellular phones, tablets, laptops, etc. In order for the application to operate effectively, updates to the database single shared value must update within a predetermined timeframe from receiving the update from the user. Millions of users may be updating the application simultaneously, and the number of simultaneous database updates cannot negatively affect the update timeframe of the single shared value.

As shown in FIG. 1, the system 100 includes a single principal server 102 in communication with a first sub-layer 104 of subordinate servers 106. Each of the subordinate servers 106 in the first sub-layer 104 is in communication with a second sub-layer 108 of subordinate servers 106. As further shown, end user devices 110 (e.g., mobile devices) communicate with the lowest sub-layer of subordinate servers 106. As will be recognized by those skilled in the art, the system 100 shown in FIG. 1 provides the communication network topology to implement the systems and methods described herein.

Referring to FIG. 2, the illustrated server topology 200 utilizes a master server 201, which sits at the top of the server topology. The master server 201 connects to a first sub-layer of slave servers 202. The master server 201 and slave servers 202 both contain databases with a same shared value. The shared value on the master server 201 database is fed the data from the databases of a first tier 203 of slave servers 202 at a predetermined time interval. The time interval is equal to the maximum number of connections that can be serviced within the desired timeframe. A second tier 204 of slave servers 202, and any number of subsequent tiers of slave servers 202, with databases containing the same shared value can be added under each of the first tier 203 of slave servers 102 to increase capacity.

Additional slave servers 202 to the first tier 203 will not add to the total processing time, but an additional tier of slave servers 202 will. For example, if the master server 201 can handle 1,000 slave servers 202 or user connections in one second, then each slave server 202 of the first tier 203 can also handle 1,000 slave servers or user connections in one second. That means that the time it takes the database of the master server 201 to service all 1,000 databases of the slave servers 202 of the first tier 203 is the same amount of time it will take each slave server 202 of the first tier 203 to service all 1,000 databases of the slave servers 202 of the second tier 204. The final outcome is that increasing the load from 1,000 user connections to 1,000,000 user connections will only double the time to two seconds.

Further, if you add a third tier of slave servers 202, you can service up to 1 billion user connections, and only triple the time it takes the master server 201 to process its user connections.

Therefore, if master server 201 can service 1,000 connections in one second using the above-described server topology, it will only take two seconds to service a million user connections with a first tier 203 of slave servers 202 and it will take only three seconds to service a billion user connections with a second tier 204 of slave servers 202.

Below is a mathematical calculation of FIG. 2 having the form of equations (EQNs) 1-5, whereby X is the number of users needed to be reached, T is the maximum amount of time to refresh value X, t is the maximum allowed time per tier, # is number of slave server tiers needed, and N is the number of user connections a single server can update in t. The maximum number of connections that can update X in T time is the number of servers in the last level or lowermost tier N, or simply N to the next power.

$$X = 1 : \# = 0 \qquad \text{EQN 1}$$

$$X = N : \# = 1 \qquad \text{EQN 2}$$

$$X = N^\wedge 2 : \# = 2 \qquad \text{EQN 3}$$

$$X = N^\wedge 3 : \# = 3 \qquad \text{EQN 4}$$

$$t = T/\# \qquad \text{EQN 5}$$

Referring to EQNs 1-5, if N=100, T=1 second, and the system must support 800,000 connections, then X=100 at the second level (one tier of slave servers), X=10,000 at the third level (two tiers of slave servers), and X=1,000,000 at the fourth level (three tiers of slave servers). Since 800,000 is greater than the number of servers at the third level and less than the number of servers in the fourth level, three tiers of slave servers are needed. At three tiers of service (#=3) and T=one second, t is 333 ms.

In order to operate at maximum efficiency, when a slave server 202 sends an update of the single shared value, which is in the form of a data packet of the single aggregate value of all the updates received by the slave server 202, to either the database in the server tier above that slave server or the database of the master server 102, then that slave server database will reset the single shared value to a default value, e.g. zero, if the single shared value is performing a counting function. By resetting after sending an update, the slave server database does not expend processing time determining the difference between the current value of the single shared value and the value of the single shared value at the time the slave server database last updated either the server in the tier above that slave server, or the master server 201.

Referring to FIG. 2, the flow of data between the databases of the master server 201 and the slave servers 202 is two-way, therefore, as the slave servers 202 are updating the single shared value in the databases of their master server 201, the master servers 201 are updating the databases of their slave servers 202 of the aggregate value of the single shared value, which is then shared with the users 110.

Referring to the alternative embodiment illustrated in FIG. 3, a separate feedback server with a database 305 is utilized to update the users 110, with the aggregate value of the single shared value. In this embodiment the flow of database values for the single shared value between the master server 301 and the slave servers 302 is one-way, therefore, as the slave servers 302 are updating the single shared value in their master server database 301, the master server 301 is sharing the aggregate value of the single shared value with the feedback server(s) 305, which is then relayed the users 110.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A method of minimizing latency in a communication network in which a plurality of user devices including a first plurality of user devices and a second plurality of user devices update a first data field, the method comprising the steps of:

providing a principal server including a principal stored value of the first data field;

providing a first sub-layer of subordinate servers in communication with the principal server, wherein each subordinate server in the first sub-layer includes a first sub-layer stored value of the first data field, wherein the first sub-layer of subordinate servers includes at least N-number of servers;

providing an N-number of groups of second sub-layer of subordinate servers in communication with the first sub-layer of subordinate servers, wherein each subordinate server in the second sub-layer includes a second sub-layer stored value of the first data field, wherein each group of the second sub-layer of subordinate servers includes at least N-number of servers in communication with a respective one of the subordinate servers in the first sub-layer of subordinate servers;

in each of the subordinate servers in the second sub-layer, receiving a first end user input value of the first data field from one or more of the first plurality of user devices;

in each of the subordinate servers in the first sub-layer, receiving a first second sub-layer input value of the first data field from each of the subordinate servers in the respective group of second sub-layer servers, wherein each subordinate server in the second sub-layer resets the respective first data field to a default value after the respective subordinate server in the first sub-layer receives the first second sub-layer input value of the first data field;

in the principal server, receiving a first first sub-layer input value of the first data field from each of the subordinate servers in the first sub-layer, wherein each subordinate server in the first sub-layer resets the respective first data field to a default value after the respective subordinate server in the principal server receives the first first sub-layer input value of the first data field;

in the principal server, updating the principal stored value of the first data field to equal an aggregated value of the first first sub-layer input value of the first data field from each of the subordinate servers in the first sub-layer, which is equal to an aggregated value of the end user input value of the first data field from each of the first plurality of user devices;

in each of the subordinate servers in the second sub-layer, receiving a second end user input value of the first data field from one or more of the second plurality of user devices;

in each of the subordinate servers in the first sub-layer, receiving a second second sub-layer input value of the first data field from each of the subordinate servers in the respective group of second sub-layer servers, wherein each subordinate server in the second sub-layer resets the respective first data field to a default value after the respective subordinate server in the first sub-layer receives the second second sub-layer input value of the first data field;

in the principal server, receiving a second first sub-layer input value of the first data field from each of the subordinate servers in the first sub-layer, wherein each subordinate server in the first sub-layer resets the respective first data field to a default value after the respective subordinate server in the principal server receives the second first sub-layer input value of the first data field; and in the principal server, updating the principal stored value of the first data field to equal an aggregated value of the first first sub-layer input value and the second first sub-layer input value of the first data field from each of the subordinate servers in the first sub-layer, which is equal to an aggregated value of the end user input value of the first data field from each of the first plurality of user devices and the second plurality of user devices.

2. The method of claim 1, wherein the principal stored value of the first data field is a sentiment value.

3. The method claim 2, wherein the sentiment value relates to a first participant in a live sporting event.

4. The method of claim 3, wherein the first participant is one of an individual or a team.

5. The method of claim 3, wherein the aggregated value of the end user input value of the first data field from each of the plurality of user devices triggers one of a visual effect or an audible effect at the live sporting event.

6. The method of claim 5, wherein the audible effect is simulated cheering at the live sporting event.

7. The method of claim 3, wherein the principal server further includes a principal stored value of a second data field.

8. The method of claim 7, wherein the principal stored value of the second data field is a sentiment value.

9. The method claim 8, wherein the sentiment value relates to a second participant in a live sporting event.

10. The method of claim 1, wherein each of the subordinate servers in the first sub-layer server collects and aggregates the second sub-layer input value of the first data field from each of the subordinate servers in the respective group of second sub-layer servers into a single update value.

11. A communication network comprising:

a principal server including a principal stored value of a first data field;

a first sub-layer of subordinate servers in communication with the principal server, wherein each subordinate server in the first sub-layer includes a first sub-layer stored value of the first data field, wherein the first sub-layer of subordinate servers includes at least N-number of servers; and an N-number of groups of second sub-layer of subordinate servers in communication with the first sub-layer of subordinate servers, wherein each subordinate server in the second sub-layer includes a second sub-layer stored value of the first data field, wherein each group of the second sub-layer of subordinate servers includes at least N-number of servers in communication with a respective one of the subordinate servers in the first sub-layer of subordinate servers;

wherein each of the subordinate servers in the second sub-layer receives a first end user input value of the first data field from one or more of a first plurality of user devices;

wherein each of the subordinate servers in the first sub-layer receives a first second sub-layer input value of the first data field from each of the subordinate servers in the respective group of second sub-layer servers, wherein each subordinate server in the second sub-layer resets the respective first data field to a default value after the respective subordinate server in the first sub-layer receives the first second sub-layer input value of the first data field;

wherein the principal server receives a first first sub-layer input value of the first data field from each of the subordinate servers in the first sub-layer, wherein each subordinate server in the first sub-layer resets the respective first data field to a default value after the respective subordinate server in the principal server receives the first first sub-layer input value of the first data field, wherein the principal server updates the principal stored value of the first data field to equal an aggregated value of the first first sub-layer input value of the first data field from each of the subordinate servers in the first sub-layer, which is equal to an aggregated value of the end user input value of the first data field from each of the first plurality of user devices;

wherein, after each subordinate server in the second sub-laver resets the respective first data field to a default value and each subordinate server in the first sub-layer resets the respective first data field to a default value, each of the subordinate servers in the second sub-layer receives a second end user input value of the first data field from one or more of a second plurality of user devices;

wherein each of the subordinate servers in the first sub-layer receives a second second sub-layer input value of the first data field from each of the subordinate servers in the respective group of second sub-laver servers, wherein each subordinate server in the second sub-laver resets the respective first data field to a default value after the respective subordinate server in the first sub-laver receives the second second sub-layer input value of the first data field;

wherein the principal server receives a second first sub-layer input value of the first data field from each of the subordinate servers in the first sub-layer, wherein each subordinate server in the first sub-layer resets the respective first data field to a default value after the respective subordinate server in the principal server receives the second first sub-layer input value of the first data field, and wherein the principal server updates the principal stored value of the first data field to equal an aggregated value of the first first sub-layer input value and the second first sub-layer input value of the first data field from each of the subordinate servers in the first sub-layer, which is equal to an aggregated value of the end user input value of the first data field from each of the first plurality of user devices and the second plurality of user devices.

12. The communication network of claim 11, wherein the principal stored value of the first data field is a sentiment value.

13. The communication network of claim 12, wherein the sentiment value relates to a first participant in a live sporting event.

14. The communication network of claim 13, wherein the first participant is one of an individual or a team.

15. The communication network of claim 13, wherein the aggregated value of the end user input value of the first data field from each of the plurality of user devices triggers one of a visual effect or an audible effect at the live sporting event.

16. The communication network of claim 15, wherein the audible effect is simulated cheering at the live sporting event.

17. The communication network of claim 13, wherein the principal server further includes a principal stored value of a second data field.

18. The communication network of claim 17, wherein the principal stored value of the second data field is a sentiment value.

19. The communication network claim 18, wherein the sentiment value relates to a second participant in a live sporting event.

20. The communication network of claim 11, wherein each of the subordinate servers in the first sub-layer server collects and aggregates the second sub-layer input value of the first data field from each of the subordinate servers in the respective group of second sub-layer servers into a single update value.

\* \* \* \* \*